US007713219B2

(12) United States Patent
Helgeson et al.

(10) Patent No.: US 7,713,219 B2
(45) Date of Patent: May 11, 2010

(54) COMBINED AIR PULSATOR AND MOVABLE PEDESTAL

(75) Inventors: Lonnie J. Helgeson, New Prague, MN (US); Michael W. Larson, New Prague, MN (US)

(73) Assignee: Electromed, Inc., New Prague, MN (US)

( * ) Notice: Subject to any disclaimer, the term of this patent is extended or adjusted under 35 U.S.C. 154(b) by 812 days.

(21) Appl. No.: 11/594,014

(22) Filed: Nov. 7, 2006

(65) Prior Publication Data

US 2008/0108921 A1 May 8, 2008

(51) Int. Cl.
*A61H 31/00* (2006.01)
*F16M 11/28* (2006.01)

(52) U.S. Cl. ........................ 601/41; 601/148; 248/129; 248/161; 248/157; 248/188.7

(58) Field of Classification Search .................. 601/41, 601/44, 148–152; 248/129, 161, 157, 188.7
See application file for complete search history.

(56) References Cited

U.S. PATENT DOCUMENTS

| | | | | | |
|---|---|---|---|---|---|
| 1,282,600 | A | * | 10/1918 | Lawlor | 248/129 |
| 2,779,329 | A | | 1/1957 | Huxley, III et al. | |
| 2,780,222 | A | | 2/1957 | Polzin et al. | |
| 3,333,581 | A | | 8/1967 | Robinson et al. | |
| D241,275 | S | | 8/1976 | Green | |
| 4,017,737 | A | | 4/1977 | Hudson et al. | |
| D246,599 | S | | 12/1977 | Ward et al. | |
| 4,607,897 | A | * | 8/1986 | Schwartz | 312/209 |
| 4,838,263 | A | | 6/1989 | Warwick et al. | |
| D341,890 | S | | 11/1993 | Sievert et al. | |
| D342,788 | S | | 12/1993 | Weaver et al. | |
| 5,562,091 | A | * | 10/1996 | Foster et al. | 128/200.24 |
| 5,569,170 | A | | 10/1996 | Hansen | |
| 5,769,800 | A | | 6/1998 | Gelfand et al. | |
| 6,036,662 | A | | 3/2000 | Van Brunt et al. | |
| 6,360,389 | B1 | * | 3/2002 | Gallant et al. | 5/658 |
| D459,477 | S | | 6/2002 | Stocks et al. | |
| 6,461,315 | B1 | * | 10/2002 | Gattinoni | 601/41 |
| 6,547,749 | B2 | | 4/2003 | Hansen | |
| 6,676,614 | B1 | | 1/2004 | Hansen et al. | |
| D498,528 | S | | 11/2004 | Van Brunt et al. | |
| 6,865,418 | B2 | | 3/2005 | Merry | |
| D510,437 | S | | 10/2005 | Lang et al. | |
| D518,267 | S | | 3/2006 | Areeta | |
| 7,048,702 | B2 | * | 5/2006 | Hui | 601/152 |
| D528,212 | S | | 9/2006 | Conway et al. | |
| 7,270,062 | B1 | * | 9/2007 | Larson | 108/147 |
| 7,562,883 | B2 | * | 7/2009 | Livengood et al. | 280/87.01 |
| 2001/0007928 | A1 | | 7/2001 | Hansen | |
| 2002/0016560 | A1 | | 2/2002 | Hansen | |
| 2003/0062045 | A1 | | 4/2003 | Woodring et al. | |
| 2004/0064076 | A1 | * | 4/2004 | Bilgi | 601/149 |
| 2005/0235988 | A1 | | 10/2005 | Hansen et al. | |
| 2006/0009718 | A1 | | 1/2006 | Van Brunt et al. | |

* cited by examiner

*Primary Examiner*—Danton DeMille
(74) *Attorney, Agent, or Firm*—Richard John Bartz

(57) ABSTRACT

A portable human body pulsating apparatus has an air pulse generator mounted on a pedestal having wheels to facilitate movement of the apparatus on a surface. The pedestal has an upright piston and cylinder assembly operable to adjust the elevation of the air pulse generator.

5 Claims, 7 Drawing Sheets

COMBINED AIR PULSATOR AND MOVABLE PEDESTAL

FIELD OF THE INVENTION

The invention relates to a portable medical device operable with a vest to apply repetitive compression forces to the body of a person to aid blood circulation, loosen and eliminate mucus from the lungs and trachea and relieve muscular and nerve tensions.

BACKGROUND OF THE INVENTION

Clearance of mucus from the respiratory tract in healthy individuals is accomplished primarily by the body's normal mucociliary action and cough. Under normal conditions these mechanisms are very efficient. Impairment of the normal mucociliary transport system or hypersecretion of respiratory mucus results in an accumulation of mucus and debris in the lungs and can cause severe medical complications such as hypoxemia, hypercapnia, chronic bronchitis and pneumonia. These complications can result in a diminished quality of life or even become a cause of death. Abnormal respiratory mucus clearance is a manifestation of many medical conditions such as pertussis, cystic fibrosis, atelectasis, bronchiectasis, cavitating lung disease, vitamin A deficiency, chronic obstructive pulmonary disease, asthma, and immobile cilia syndrome. Exposure to cigarette smoke, air pollutants and viral infections also adversely affect mucociliary function. Post surgical patients, paralyzed persons, and newborns with respiratory distress syndrome also exhibit reduced mucociliary transport.

Chest physiotherapy has had a long history of clinical efficacy and is typically a part of standard medical regimens to enhance respiratory mucus transport. Chest physiotherapy can include mechanical manipulation of the chest, postural drainage with vibration, directed cough, active cycle of breathing and autogenic drainage. External manipulation of the chest and respiratory behavioral training are accepted practices. The various methods of chest physiotherapy to enhance mucus clearance are frequently combined for optimal efficacy and are prescriptively individualized for each patient by the attending physician.

Cystic fibrosis (CF) is the most common inherited life-threatening genetic disease among Caucasians. The genetic defect disrupts chloride transfer in and out of cells, causing the normal mucus from the exocrine glands to become very thick and sticky, eventually blocking ducts of the glands in the pancreas, lungs and liver. Disruption of the pancreatic glands prevents secretion of important digestive enzymes and causes intestinal problems that can lead to malnutrition. In addition, the thick mucus accumulates in the lung's respiratory tracts, causing chronic infections, scarring, and decreased vital capacity. Normal coughing is not sufficient to dislodge these mucus deposits. CF usually appears during the first 10 years of life, often in infancy. Until recently, children with CF were not expected to live into their teens. However, with advances in digestive enzyme supplementation, anti-inflammatory therapy, chest physical therapy, and antibiotics, the median life expectancy has increased to 30 years with some patients living into their 50s and beyond. CF is inherited through a recessive gene, meaning that if both parents carry the gene, there is a 25 percent chance that an offspring will have the disease, a 50 percent chance they will be a carrier and a 25 percent chance they will be genetically unaffected. Some individuals who inherit mutated genes from both parents do not develop the disease. The normal progression of CF includes gastrointestinal problems, failure to thrive, repeated and multiple lung infections, and death due to respiratory insufficiency. While some patients experience grave gastrointestinal symptoms, the majority of CF patients (90 percent) ultimately succumb to respiratory problems.

Virtually all patients with CF require respiratory therapy as a daily part of their care regimen. The buildup of thick, sticky mucus in the lungs clogs airways and traps bacteria, providing an ideal environment for respiratory infections and chronic inflammation. This inflammation causes permanent scarring of the lung tissue, reducing the capacity of the lungs to absorb oxygen and, ultimately, sustain life. Respiratory therapy must be performed, even when the patient is feeling well, to prevent infections and maintain vital capacity. Traditionally, care providers perform Chest Physical Therapy (CPT) one to four times per day. CPT consists of a patient lying in one of twelve positions while a caregiver "claps" or pounds on the chest and back over each lobe of the lung. To treat all areas of the lung in all twelve positions requires pounding for half to three-quarters of an hour along with inhalation therapy. CPT clears the mucus by shaking loose airway secretions through chest percussions and draining the loosened mucus toward the mouth. Active coughing is required to ultimately remove the loosened mucus. CPT requires the assistance of a caregiver, often a family member but a nurse or respiratory therapist if one is not available. It is a physically exhausting process for both the CF patient and the caregiver. Patient and caregiver non-compliance with prescribed protocols is a well-recognized problem that renders this method ineffective. CPT effectiveness is also highly technique sensitive and degrades as the giver becomes tired. The requirement that a second person be available to perform the therapy severely limits the independence of the CF patient.

Artificial respiration devices for applying and relieving pressure on the chest of a person have been used to assist in lung breathing functions, and loosening and eliminating mucus from the lungs of CF persons. Subjecting the person's chest and lungs to pressure pulses or vibrations decreases the viscosity of lung and air passage mucus, thereby enhancing fluid mobility and removal from the lungs. An example of a body pulsating method and device disclosed by C. N. Hansen in U.S. Pat. No. 6,547,749, incorporated herein by reference, has a case accommodating an air pressure and pulse generator. A handle pivotally mounted on the case is used as a hand grip to facilitate transport of the generator. The case including the generator must be carried by a person to different locations to provide treatment to individuals in need of respiratory therapy. These devices use vests having air-accommodating bladders that surround the chests of persons. An example of a vest used with a body pulsating device is disclosed by C. N. Hansen and L. J. Helgeson in U.S. Pat. No. 6,676,614. The vest is used with an air pressure and pulse generator. Mechanical mechanisms, such as solenoid or motor-operated air valves, bellows and pistons are disclosed in the prior art to supply air under pressure to diaphragms and bladders in regular pattern or pulses. Manually operated controls are used to adjust the pressure of the air and air pulse frequency for each patient treatment and during the treatment. The bladder worn around the thorax of the CF person repeatedly compresses and releases the thorax at frequencies as high as 25 cycles per second. Each compression produces a rush of air through the lobes of the lungs that shears the secretions from the sides of the airways and propels them toward the mouth where they can be removed by normal coughing. Examples of chest compression medical devices are disclosed in the following U.S. patents.

W J Warwick and L G. Hansen in U.S. Pat. Nos. 4,838,263 and 5,056,505 disclose a chest compression apparatus having a chest vest surrounding a person's chest. A motor-driven rotary valve located in a housing located on a table allows air to flow into the vest and vent air therefrom to apply pressurized pulses to the person's chest. An alternative pulse pumping system has a pair of bellows connected to a crankshaft with rods operated with a dc electric motor. The speed of the motor is regulated with a controller to control the frequency of the pressure pulses applied to the vest. The patient controls the pressure of the air in the vest by opening and closing the end of an air vent tube. The apparatus must be carried by a person to different locations to provide treatment to persons in need of respiratory therapy.

M Gelfand in U.S. Pat. No. 5,769,800 discloses a vest design for a cardiopulmonary resuscitation system having a pneumatic control unit equipped with wheels to allow the control unit to be moved along a support surface.

N. P. Van Brunt and D J Gagne in U.S. Pat. Nos. 5,769,797 and 6,036,662 disclose an oscillatory chest compression device having an air pulse generator including a wall with an air chamber and a diaphragm mounted on the wall and exposed to the air chamber. A rod pivotally connected to the diaphragm and rotatably connected to a crankshaft transmits force to the diaphragm during rotation of the crankshaft. An electric motor drives the crankshaft at selected controlled speeds to regulate the frequency of the air pulses generated by the moving diaphragm. A blower delivers air to the air chamber to maintain the pressure of the air in the chamber. Controls for the motors that move the diaphragm and rotate the blower are responsive to the air pressure pulses and pressure of the air in the air chamber. These controls have air pulse and air pressure responsive feedback systems that regulate the operating speeds of the motors to control the pulse frequency and air pressure in the vest. The air pulse generator is a mobile unit having a handle and a pair of wheels.

SUMMARY OF THE INVENTION

The invention is a medical device used to deliver high-frequency chest wall oscillations to promote airway clearance and improve bronchial drainage in humans. The primary components of the device include an air-pulse generator, an air inflatable vest, and a flexible hose coupling the generator to the vest for transmitting air pressure and pressure pulses from the generator to the vest. The air-pulse generator is mounted on a pedestal having wheels that allow the generator to be moved to different locations to provide therapy treatments to a number of persons. The pedestal includes a linear lift that allows the elevation or height of the air-pulse generator to be adjusted to accommodate different locations and persons. The air-pulse generator includes a housing supporting generator controls for convenient use. The housing has a top handle used to manually transport the air-pulse generator. The housing is supported on and secured to a frame assembly joined to the top of the pedestal. The frame assembly has parallel horizontal members connected to a platform engaging the bottom of the housing of the air-pulse generator. Upright members joined to the horizontal members are fastened to opposite sides of the housing of the air-pulse generator. U-shaped handles joined to and extended outwardly from the upright members provide handles to facilitate movement of the pedestal and air-pulse generator.

DESCRIPTION OF INVENTION

Figure 1:
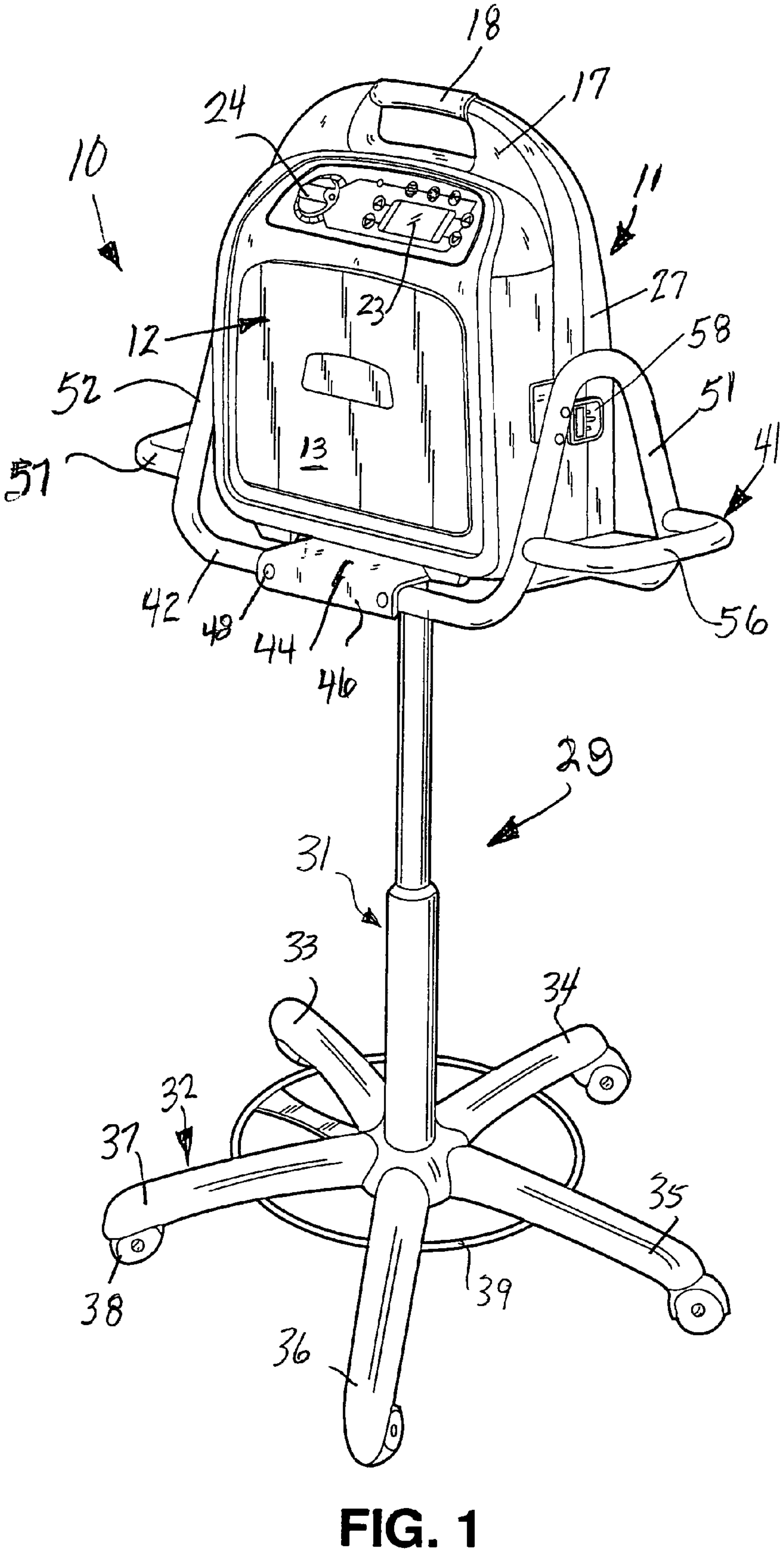
FIG. 1 is a perspective view of the combined air pulsator and movable pedestal of our invention.
Figure 2:
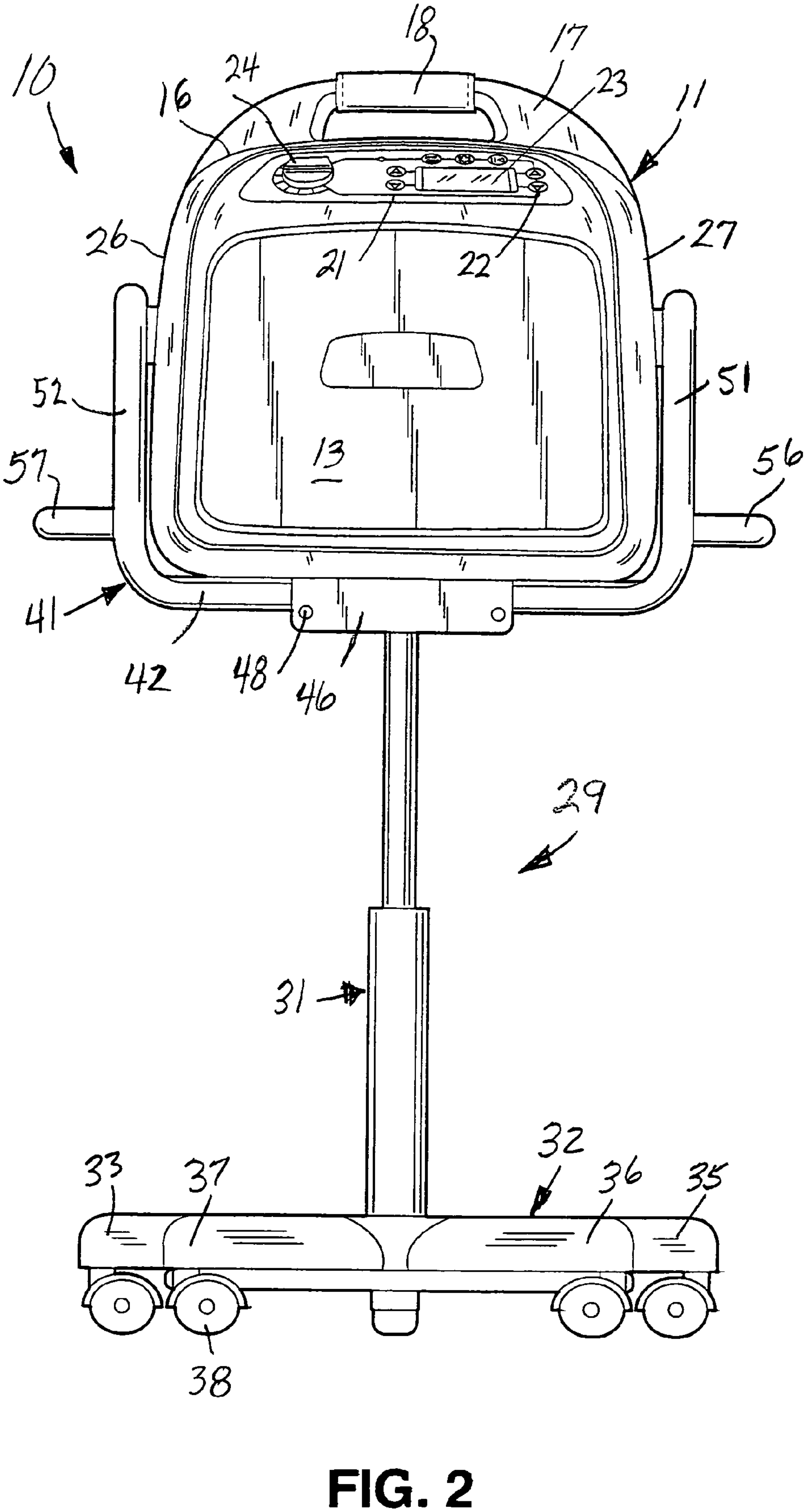
FIG. 2 is a front elevational view thereof.
Figure 4:
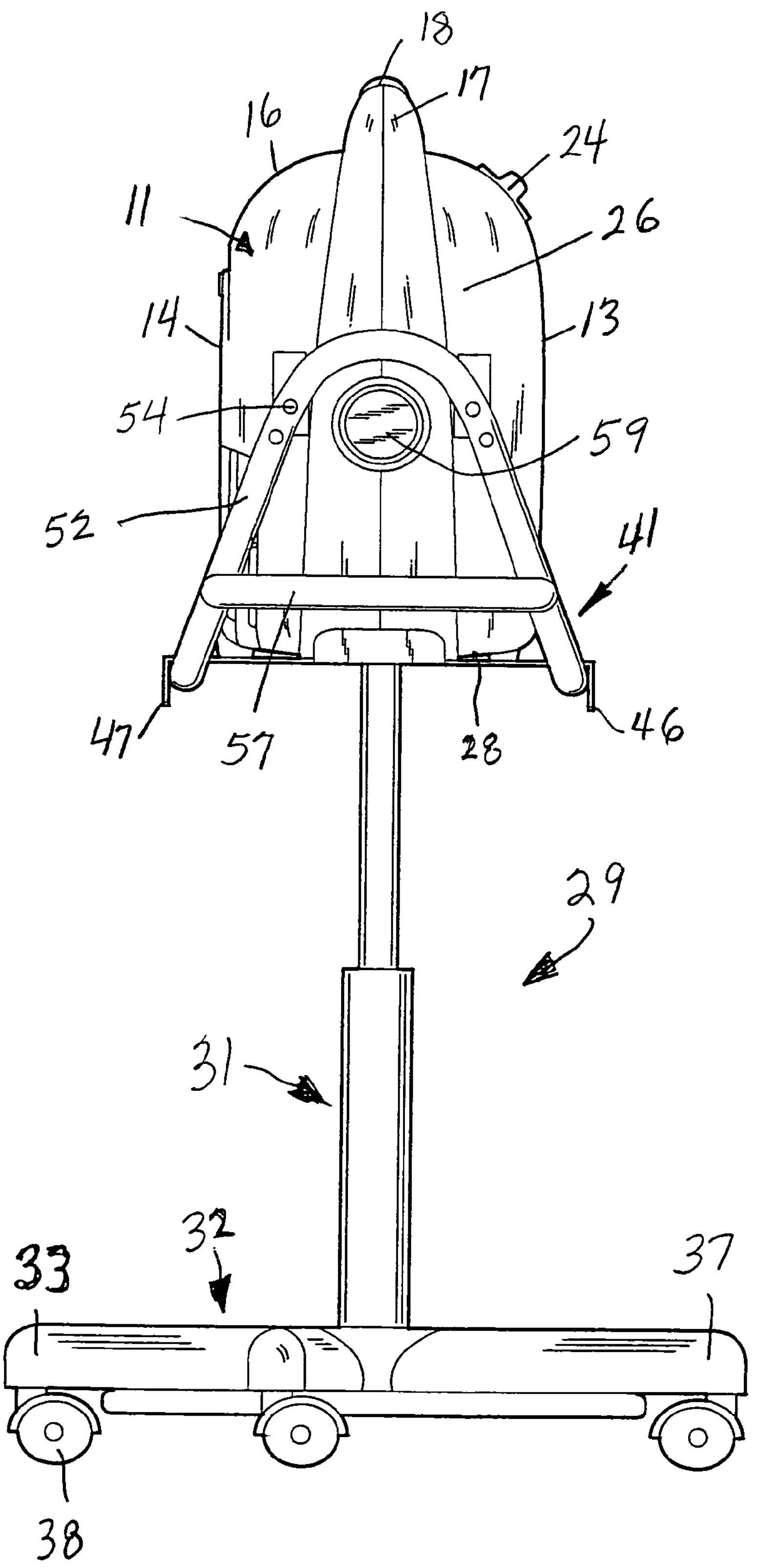
FIG. 4 is a side elevational view of the left side thereof.

A portable human body pulsating apparatus 10, shown in FIGS. 1 and 4, comprises an air-pulse generator 11 having a housing 12. A movable pedestal 29 supports generator 11 and housing 12 on a surface, such as a floor. Pedestal 29 allows respiratory therapists and patient careperson to transport the entire human body pulsating apparatus to different locations accommodating a number of persons in need of respiratory therapy and to storage locations.

Human body pulsating apparatus 10 is used with a vest (not shown) to apply repetitive pressure pulse to a person's thorax to provide secretion and mucous clearance therapy. An example of a respiratory vest is disclosed by C N. Hansen and L H Helgeson in U.S. Pat. No. 6,676,614 incorporated herein by reference. Respiratory mucous clearance is applicable to many medical conditions, such as pertussis, cystic fibrosis, atelectasis, bronchiectasis, cavitating lung disease, vitamin A deficiency, chronic obstructive pulmonary disease, asthma, and immobile cilia syndrome. Post surgical patients, paralyzed persons, and newborns with respiratory distress syndrome have reduced mucociliary transport. Apparatus 10 provides high frequency chest wall oscillations or pulses to enhance mucus and airway clearance in a person with reduced mucociliary transport. High frequency pressure pulses subject to the thorax in addition to providing respiratory therapy to a person's lungs and trachea, also stimulates the heart and blood flow in arteries and veins in the chest cavity. Muscular and nerve tensions are also relieved by the repetitive pressure pulses imparted to the front, sides, and back portions of the thorax. The lower part of the thoracic cage comprises the abdominal cavity which reaches upward as high as the lower tip of the sternum so as to afford considerable protection to the large and easily injured abdominal organs, such as the liver, spleen, stomach, and kidneys. The abdominal cavity is only subjected to very little high frequency pressure pulses.

Housing 12 is a generally rectangular member having front and back walls 13 and 14 and side walls 26 and 27 joined to a top wall 16. An arched member 17 having a horizontal handle 18 extended over top wall 16 is joined to opposite portions of top wall 16 whereby handle 18 can be used to manually carry air-pulse generator 11 and facilitate mounting air-pulse generator 11 on pedestal 29. A control panel 19 mounted on top wall 16 has time coated keys 21 and frequency control keys 22 located on opposite sides of a visual control screen 23. An air pressure control knob 24 is located on the left side of panel 19. Control keys 21 and 22, screen 23 and air pressure control knob 24 are in locations that are readily accessible by the respiratory therapists and user of apparatus 10. The operating elements and functions and controls of air-pulse generator 11 are disclosed by C. N. Hansen, P. E. Cross and L. T. Helgeson in U.S. application Ser. No. 11/089,862 and incorporated herein by reference. An alternative air pulse generators are disclosed by C. N. Hansen in U.S. Pat. Nos. 6,488,641 and 6,547,749 incorporated herein by reference.

Person care homes, assisted living facilities and clinics can accommodate a number of persons in different rooms or locations that require respiratory therapy or high frequency chest wall oscillations as medical treatments. The portable pulsating apparatus 10 can be manually moved to required locations and connect with a flexible hose to a vest located around a person's thorax or other body members. The vest can be a single person garment designed to comfortably fit the person.

Pedestal 29, shown in FIGS. 1 to 7, has an upright gas operated piston and cylinder assembly 31 mounted on a base 32 having outwardly extended legs 33, 34, 35, 36 and 37. Other types of linear expandable and contractible devices can be used to change the location of generator 11. Caster wheels 38 are pivotally mounted on the outer ends of legs 33-37 to facilitate movement of body pulsating apparatus 10 along a support surface. One or more wheels 38 are provided with releasable brakes to hold apparatus 10 is a fixed location. An example of a pedestal is disclosed in U.S. Pat. No. 5,366,275. The piston and cylinder assembly 31 is linearly extendable to elevate air-pulse generator 11 to a height convenient to the respiratory therapist or user. A gas control valve having a foot operated ring lever 39 is used to regulate the linear extension of piston and cylinder assembly 31 and resultant elevation of generator 11. Generator 11 can be located in positions between its up and down positions. Lever 39 and gas control valve are operative associated with the lower end of piston and cylinder assembly 31.

Figure 3:
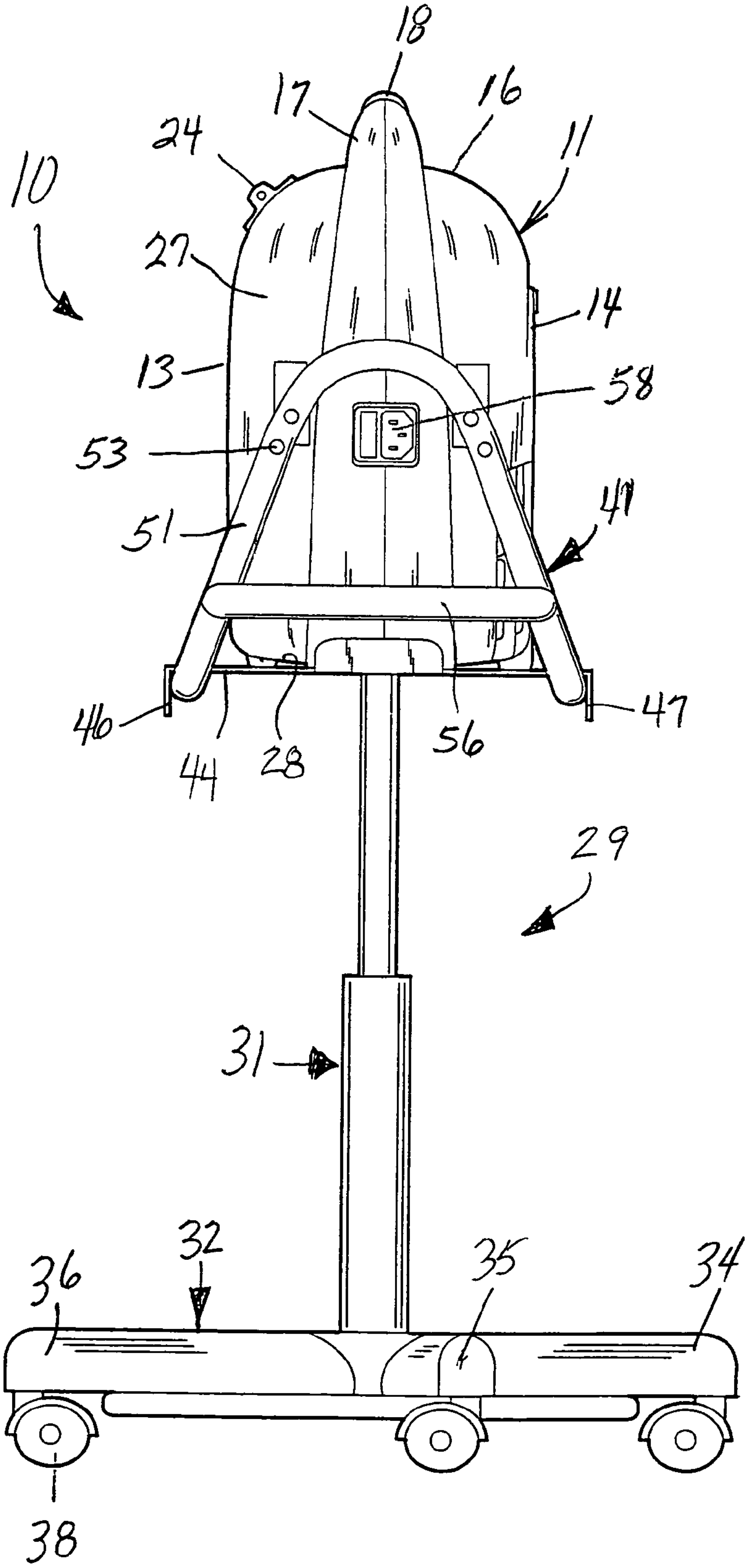
FIG. 3 is a side elevational view of the right side thereof.
Figure 5:
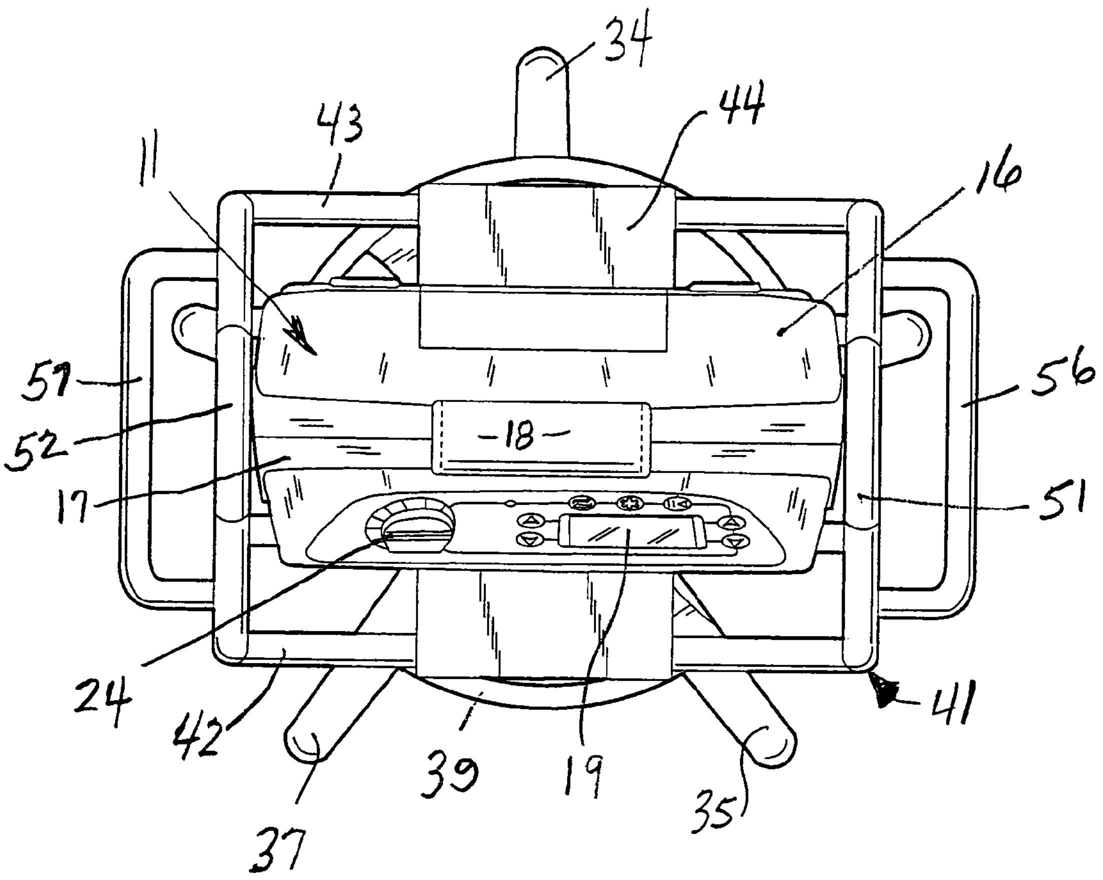
FIG. 5 is a top plan view thereof.
Figure 6:
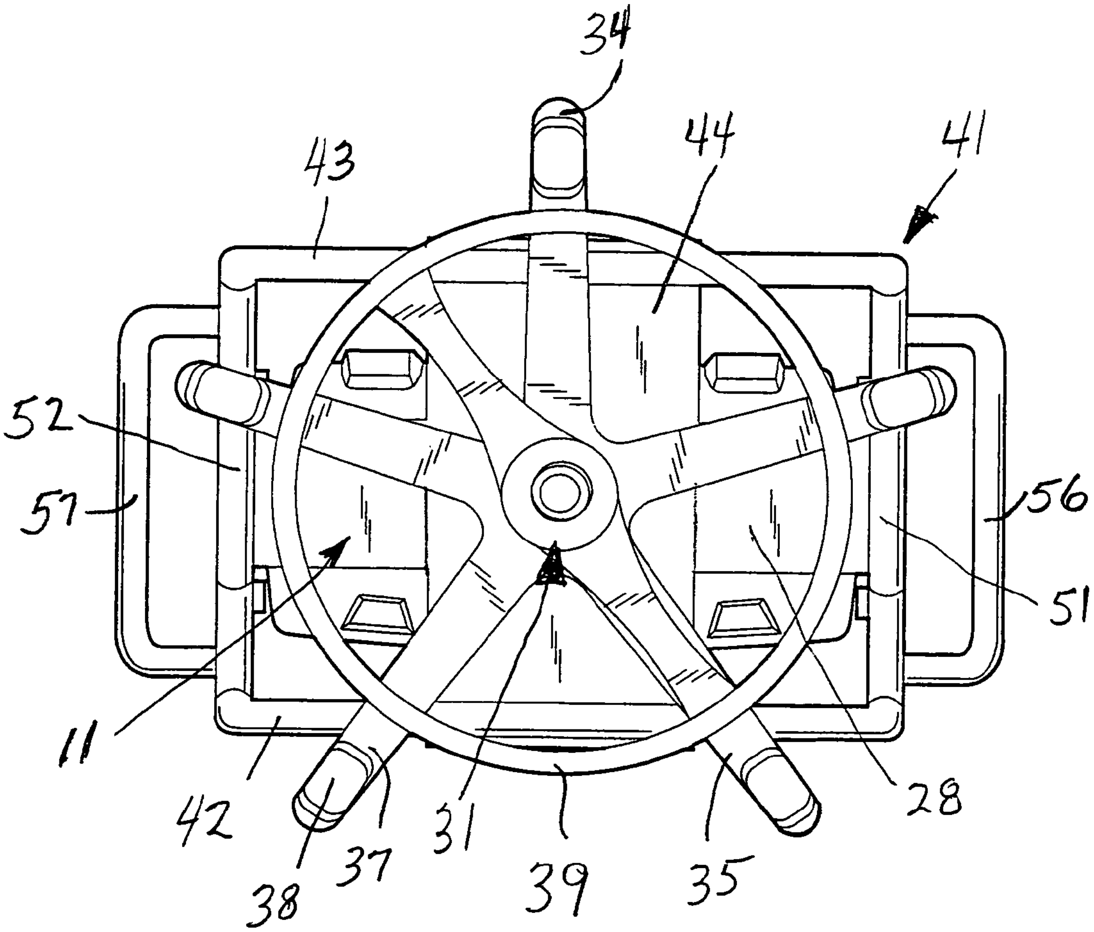
FIG. 6 is a bottom plan view thereof.
Figure 7:
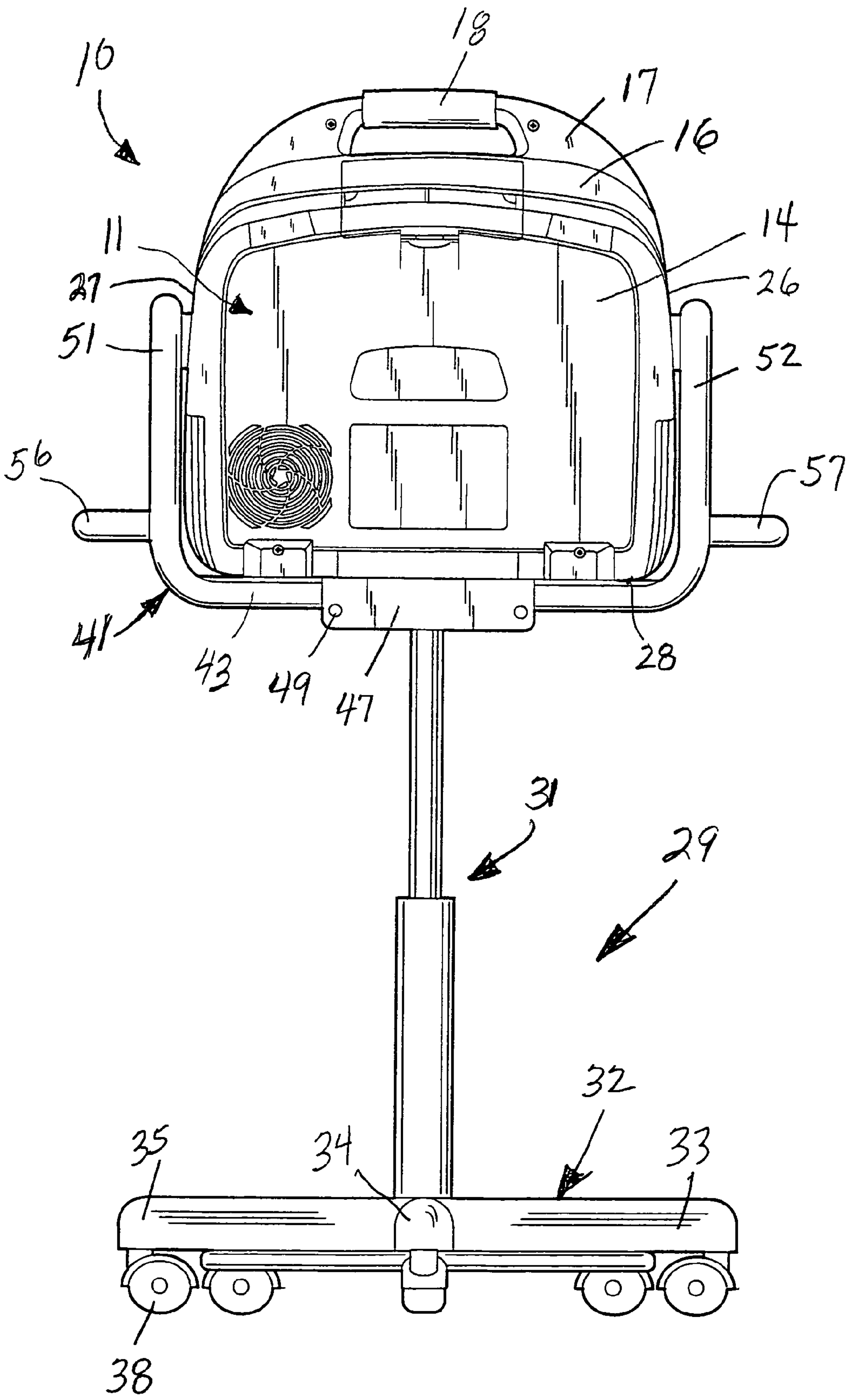
FIG. 7 is a rear elevational view thereof.

As shown in FIGS. 5 and 6, a frame assembly 41 having parallel horizontal members 42 and 43 and a platform 44 mounts housing 12 on top of upright piston and cylinder assembly 31. The upper member of piston and cylinder assembly 31 is secured to the middle of platform 44. The opposite ends 46 and 47 of platform 44 are turned down over horizontal members 42 and 43 and secured thereto with fasteners 48 and 49. Upright inverted U-shaped arms 51 and 52 joined to opposite ends of horizontal members 42 and 43 are located adjacent opposite side walls 26 and 27 of housing 12. As shown in FIGS. 3 and 4, fasteners 53 and 54 secure arms 51 and 52 to opposite side walls 26 and 27 of housing 12. U-shaped handles 56 and 57 are joined to and extend outwardly from arms 51 and 52 provide hand grips to facilitate manual movement of the air-pulse generator 11 and pedestal 29 on a floor or carpet. As shown in FIGS. 1 and 3, an electrical female receptacle 58 mounted on side wall 27 faces the area surrounded by arm 51 so that arm 51 protects the male plug (not shown) that fits into receptacle 58 to provide electric power to air-pulse generator 11. As shown in FIG. 4, a tubular air outlet sleeve 59 is mounted on side wall 26 of housing 12. The hose leading to the vest telescopes into sleeve 59 to allow air and air pressure pulses to travel in the hose to the vest to apply pressure pulses to a person's body.

The advantages and details of structures and functions of the preferred embodiments have been disclosed. They are exemplary and other equivalents are feasible. Therefore, changes in shape, size, elements, and arrangement of pedestal and generator structures can be made by a person skilled in the area within the scope of the invention.

The invention claimed is:

1. A portable human body pulsating apparatus useable with a vest located around the human body to apply repetitive compression forces to the body comprising:

a generator for creating air pressure and air pressure pulses adapted to be transmitted to the vest, said generator including a housing, said housing having a top wall and upright walls on opposite sides of the housing, a pedestal having an upper end and a lower end, a frame assembly secured to the upper end of the pedestal, said frame assembly including horizontal members, a horizontal platform mounted on the horizontal members supporting the housing, upright inverted U-shaped arms joined to the horizontal members located adjacent the upright walls of the housing, fasteners connecting the upright inverted U-shaped arms to the upright walls of the housing to secure the generator to the frame assembly and maintain the housing on the platform, said pedestal including a single upright piston and cylinder assembly operable to adjust the elevation of the generator, a base having outwardly extended legs connected to the piston and cylinder assembly, wheels mounted on the legs to facilitate movement of the apparatus on a surface, and at least one handle secured to and extended outwardly from one of the upright inverted U-shaped arms for manually facilitating movement of the apparatus on a surface and adjustment of the elevation of the generator.

2. The apparatus of claim 1 including:

a handle secured to and extended outwardly from each upright inverted U-shaped arm for manually facilitating movement of the apparatus on the surface and adjustment of the elevation of the generator.

3. The apparatus of claim 1 including:

a second handle joined to the top wall of the housing for manually facilitating adjustment of the elevation of the generator.

4. A portable human body pulsating apparatus useable with a vest located around the human body to apply repetitive compression forces to the body comprising:

a generator for creating air pressure and air pressure pulses adapted to be transmitted to the vest, said generator including a housing, said housing having a top wall and upright walls on opposite sides of the housing, a pedestal having an upper end and a lower end, a frame assembly secured to the upper end of the pedestal, said frame assembly including horizontal members, a horizontal platform mounted on the horizontal members supporting the housing, upright inverted U-shaped arms joined to the horizontal members located adjacent the upright walls of the housing, fasteners connecting the upright inverted U-shaped arms to the upright walls of the housing to secure the generator to the frame assembly and maintain the housing on the platform, said pedestal including a single upright piston and cylinder assembly operable to adjust the elevation of the generator, a base having outwardly extended legs connected to the piston and cylinder assembly, wheels mounted on the legs to facilitate movement of the apparatus on a surface, first handles secured to and extended outwardly from the upright inverted U-shaped arms for manually facilitating movement of the apparatus on the surface and adjustment of the elevation of the generator, and a second handle joined to the top wall of the housing for manually facilitating adjustment of the elevation of the generator.

5. The apparatus of claim 4 wherein:

each of the first handles have a U-shape.

* * * * *